(12) United States Patent
Hill

(10) Patent No.: US 6,889,470 B1
(45) Date of Patent: May 10, 2005

(54) PLANT PROTECTOR SECURING DEVICE

(76) Inventor: Jerry R. Hill, 24559 S. Klingville Rd., Chassell, MI (US) 49916

( * ) Notice: Subject to any disclaimer, the term of this patent is extended or adjusted under 35 U.S.C. 154(b) by 0 days.

(21) Appl. No.: 10/672,874

(22) Filed: Sep. 29, 2003

(51) Int. Cl.[7] ............................................. A01G 13/02
(52) U.S. Cl. ......................................................... 47/31
(58) Field of Search ............................ 47/2, 20.1, 23.1, 47/23.2, 29.1, 31, 29.5, 29.6, 45; 135/115, 135/118, 119, 913, 907, 905, 100, 127, 147, 135/116, 120.1, 120.2, 120.3, 120.4; 52/3–5; 150/154

(56) References Cited

U.S. PATENT DOCUMENTS

| 715,603 A | * | 12/1902 | Quarrie et al. ............... 135/100 |
| 893,704 A | | 7/1908 | Byrne |
| 951,807 A | | 3/1910 | Erdly |
| 1,584,632 A | | 5/1926 | Merwarth et al. |
| 1,600,749 A | * | 9/1926 | Barnes ........................ 47/23.2 |
| 2,102,748 A | * | 12/1937 | Rocquin .................. 47/1.01 R |
| 2,844,915 A | * | 7/1958 | Woelk .......................... 47/31.1 |
| 3,162,920 A | * | 12/1964 | Durham ..................... 24/265 R |
| 4,589,224 A | * | 5/1986 | Collette ................... 47/1.01 R |
| 4,711,051 A | | 12/1987 | Fujimoto |
| 4,750,508 A | * | 6/1988 | Tatoian ......................... 135/87 |
| 4,858,380 A | | 8/1989 | Gayle |
| 4,964,771 A | * | 10/1990 | Callihan ...................... 410/118 |
| 5,137,324 A | * | 8/1992 | Hershberger ........... 296/100.16 |
| 5,456,043 A | * | 10/1995 | Dacon, Sr. .................... 47/23.2 |
| 5,579,610 A | | 12/1996 | Jackson |
| 6,017,174 A | * | 1/2000 | Ross et al. .................. 410/100 |
| 6,152,664 A | * | 11/2000 | Dew et al. .................. 410/100 |
| 6,167,896 B1 | * | 1/2001 | Smith ........................... 135/96 |
| 6,663,328 B2 | * | 12/2003 | Schmidt et al. ............... 410/97 |

FOREIGN PATENT DOCUMENTS

DE          4005409 A1 *   8/1991

* cited by examiner

Primary Examiner—Son T. Nguyen

(57) ABSTRACT

A plant protector securing device includes a flexible panel that has a top side, a bottom side, and a peripheral edge. Each of a plurality of elongate members has an attached end attached to the peripheral edge and a free end extending away from the panel. Each of a plurality of spikes is attached to one of the free ends of the elongate members. The bottom side of the panel may be abutted against an upper side of a rose protective covering and the spikes driven into a ground surface such that the device secures the protective covering to the ground surface.

1 Claim, 4 Drawing Sheets

PLANT PROTECTOR SECURING DEVICE

BACKGROUND OF THE INVENTION

1. Field of the Invention

The present invention relates to plant protector devices and more particularly pertains to a new plant protector device for ensuring that a rose protective covering is not dislodged from a rosebush or otherwise moved during winter months.

2. Description of the Prior Art

The use of plant protector devices is known in the prior art. The object of these devices is generally to protect a plant from animals or insects but are not generally optimal for protecting a rose from cold weather. One type of device which accomplishes this is a solid covering which is positioned over a rose bush. A problem with this type of device is that wind may have the affect of moving the covering off of the rose bush. For this reason, the need remains for a device that retains, on a ground surface, a conventional rose protective device used for ensuring that a rosebush is protected from the elements during winter months.

SUMMARY OF THE INVENTION

The present invention meets the needs presented above by a flexible panel that has a top side, a bottom side, and a peripheral edge. Each of a plurality of elongate members has an attached end attached to the peripheral edge and a free end extending away from the panel. Each of a plurality of spikes is attached to one of the free ends of the elongate members. The bottom side of the panel may be abutted against an upper side of a rose protective covering and the spikes driven into a ground surface such that the device secures the protective covering to the ground surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
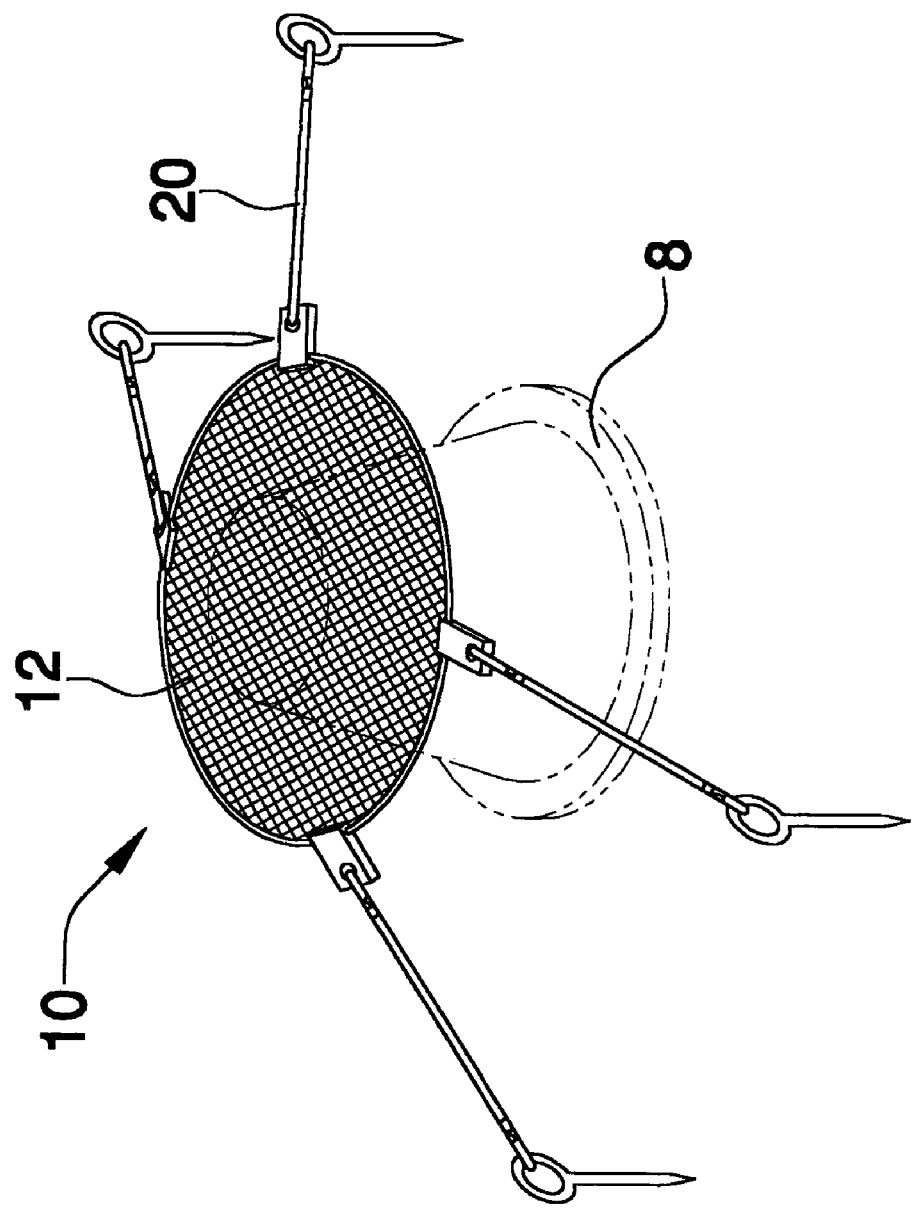
FIG. 1 is a schematic perspective view of a plant protector securing device according to the present invention.
Figure 2:
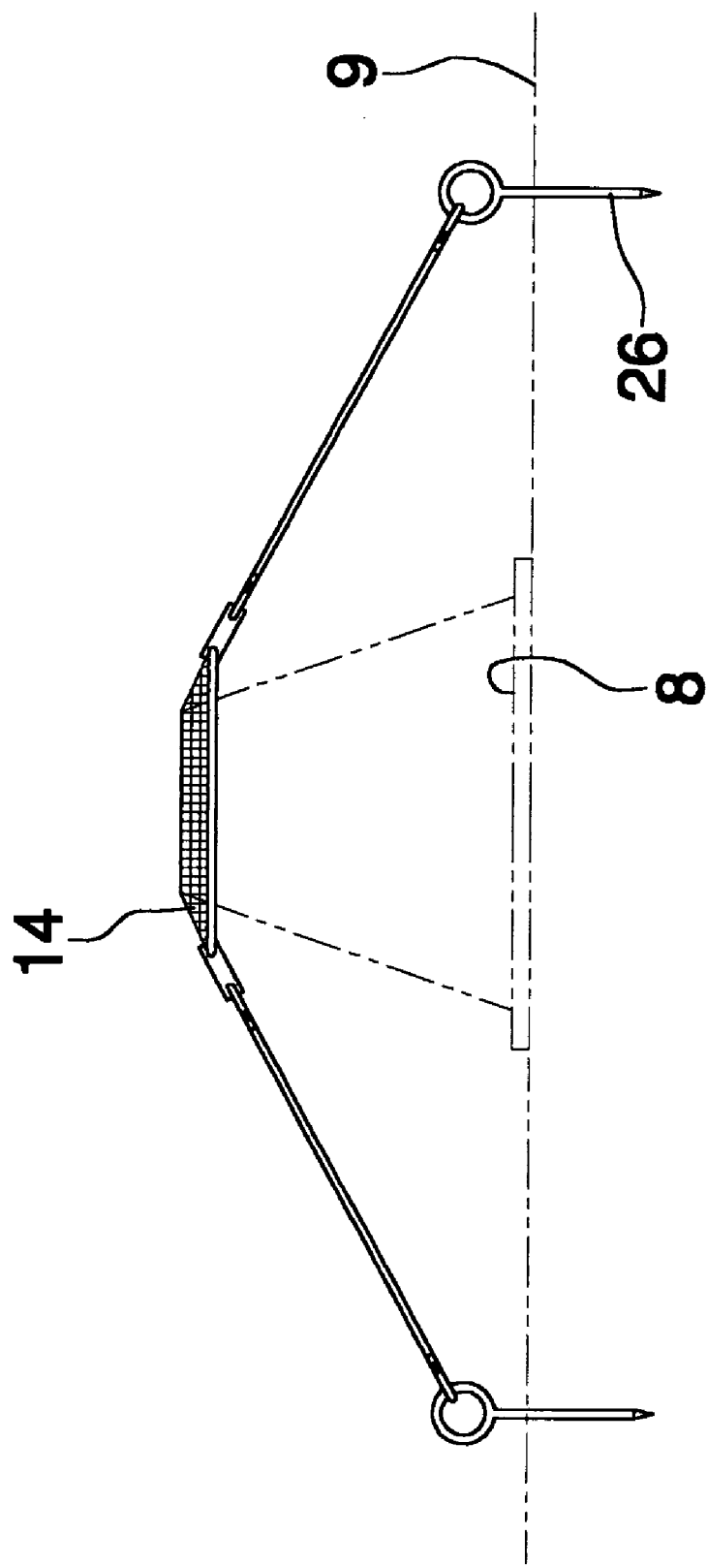
FIG. 2 is a schematic side in-use view of the present invention.
Figure 3:
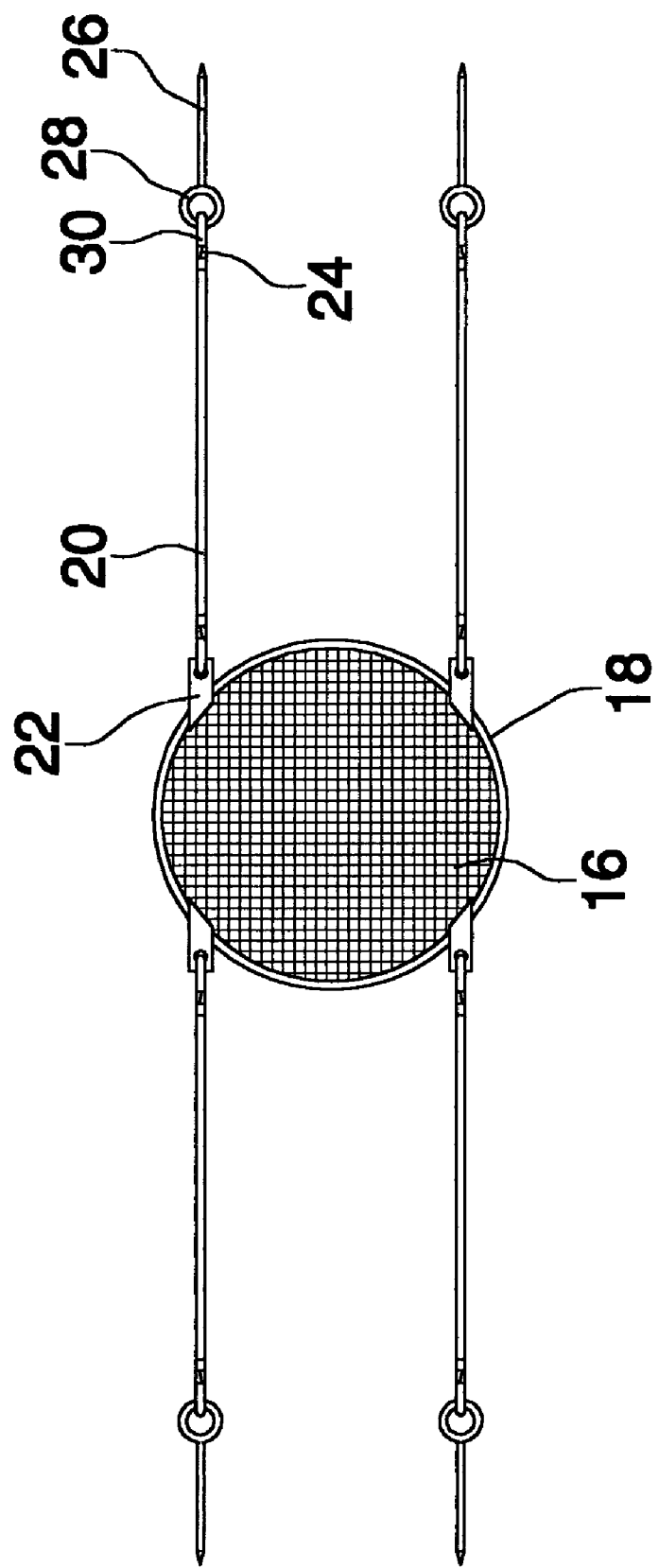
FIG. 3 is a schematic bottom view of the present invention.
Figure 4:
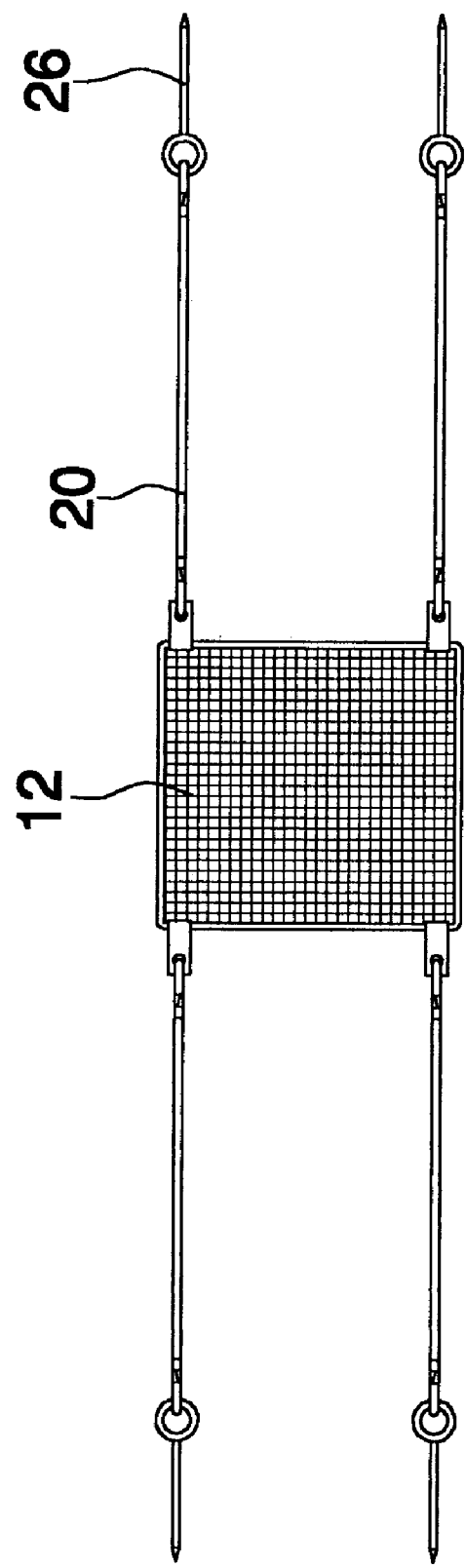
FIG. 4 is a schematic top view of a second embodiment of the present invention.

With reference now to the drawings, and in particular to FIGS. 1 through 4 thereof, a new plant protector device embodying the principles and concepts of the present invention and generally designated by the reference numeral 10 will be described.

As best illustrated in FIGS. 1 through 4, the plant protector 8 securing device 10 and method for use generally comprises a flexible panel 12 having a top side 14, a bottom side 16, and a peripheral edge 18. The peripheral edge 18 preferably comprises an elastomeric loop. A portion of the panel 12 positioned within the peripheral edge preferably comprises a resiliently elastic mesh material that is ideally a nylon material. The panel 12 preferably has a circular shape as shown in FIG. 1, though rectangular shapes, such as the one depicted in FIG. 4, may also be used.

Each of a plurality of elongate members 20 has an attached end 22 attached to the peripheral edge 18 and a free end 24 extending away from the panel 12. The elongate members 20 are spaced from each other. Each of the elongate members 20 is flexible and each is preferably resiliently elastic. The plurality of elongate members 20 includes at least four elongate members. Each of a plurality of spikes 26 is attached to one of the free ends 24 of the elongate members 20. The spikes 26 preferably include rings 28 which are attached to loops 30 positioned on the free ends 24 so that the spikes 26 are easily rotated about the elongate members 20.

In use, the bottom side 16 of the panel 12 may be abutted against an upper side of a protective covering 8. The protective covering 8 is typical of the types uses for protecting roses during the winter months. The size of the panel 12 and length of the elongate members 20 may be varied depending on the size of the protective covering 8. The spikes 26 driven into a ground surface 9 such that the device 10 secures the protective covering 8 to the ground surface and prevents its movement during the winter months. The spikes 26 are preferably positioned so that the elongate members 20 are in a stretched position to provide downward force on the protective covering 8.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method protecting a rose bush comprising the steps of:

providing a protective covering;

positioning the protective covering over the rose bush;

providing a flexible panel, said panel having a top side, a bottom side, and a peripheral edge, said peripheral edge comprising an elastomeric loop, a portion of said panel positioned within said peripheral edge comprising a resiliently elastic mesh material;

providing a plurality of elongate members each having an attached end attached to said peripheral edge and a free end extending away from said panel, said elongate members being spaced from each other, each of said elongate members being flexible, each of said elongate members being resiliently elastic, said plurality or elongate members including at least four elongate members;

providing a plurality of spikes, each of said spikes being attached to one of said free ends of said elongate members; and positioning said bottom side of said panel against an upper side of the protective covering and driving said spikes into a ground surface such that said elongate members are in a stretched state.

* * * * *